March 29, 1932.

W. E. WREAD

LATCH UNIT

Original Filed Aug. 31, 1925

Re. 18,399

INVENTOR
WILLIAM E. WREAD by James R. Townsend
his atty.

WITNESS
Robt. S. Woolsey

Reissued Mar. 29, 1932

Re. 18,399

UNITED STATES PATENT OFFICE

WILLIAM E. WREAD, OF LOS ANGELES, CALIFORNIA, ASSIGNOR, BY MESNE ASSIGNMENTS, TO McKINNEY MANUFACTURING COMPANY, OF PITTSBURGH, PENNSYLVANIA, A CORPORATION OF PENNSYLVANIA

LATCH UNIT

Original application filed August 31, 1925, Serial No. 53,548. Renewed January 4, 1928. Original No. 1,720,636, dated July 9, 1929. Application for reissue filed July 31, 1930. Serial No. 472,094.

This invention relates to that type of latch unit particularly applicable to the doors of houses, closets, cupboards and similar structures.

One object is to provide a novel latch unit having handles on each side of the door to which it is attached and the bolt of which may be retracted by the handle on either side of the door, irrespective of whether or not the handle on the other side of the door is immovably held.

Another object is to provide a latch unit of the character described in which the handles or knobs may be securely fastened to the bolt operating means without the necessity of set screws.

Another object is to provide a novel mounting for the knobs of a door whereby end play of the shaft to which the knobs are secured is practically eliminated.

A further object is to provide a spring-pressed bolt mechanism the effective length of which may be varied so as to permit adjustment thereof when the same is applied to a door without, however, varying the effective force of the spring.

A still further object is to provide a latch structure having a spring-pressed bolt mechanism in which the spring which acts on the bolt mechanism is inside the latch casing so that the latch structure may be applied to a door without the necessity of separately applying the spring.

A still further object is to provide a latch structure comprising a casing having a latch bolt carrier cooperating therewith which is adapted to assume a position substantially entirely within the confines of the casing to facilitate the application of the latch structure to a door.

The invention further provides a latch unit with a cross-head at the inner end of the draw bolt mechanism and which cross-head may be independently operated from either side of the latch unit to retract the draw bolt.

Objects of my invention are to provide a latch unit, which is simple in construction, inexpensive to manufacture and which may be quickly installed with a minimum amount of labor.

Features of invention reside in the parts and combinations of parts as more fully hereinafter described.

Other objects, advantages and features of invention may appear from the accompanying drawings, the subjoined detailed description and the appended claims.

In the accompanying drawings I have shown a present preferred embodiment of the invention, in which Fig. 1 is a plan view of a latch unit constructed in accordance with this invention, attached to a door a fragment of which is shown. Dotted lines indicate the lock body.

Figure 8:
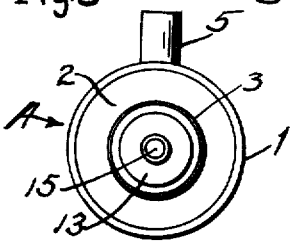
Fig. 8 is a side elevation of the assembly shown in Figs. 6 and 7.
Figure 8A:
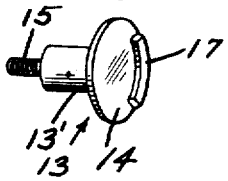

Fig. 8*a* is a perspective view of the latch unit bolt retracting member.

Arrows on the various section lines indicate the direction of sight for the respective views.

My latch unit A comprises a tubular body 1 and end plates 2 that are threaded into or otherwise secured to either end of the body 1, and if desired one plate may thread into the body and the other may be cast integral therewith. Each plate 2 is formed with a tubular extension 3, which extends therefrom, and protrudes from the front or rear face of the door *a* as the case may be.

A draw bolt 4 screws into a hollow sleeve 5 that is slidably mounted on a pin 6 for reciprocal movement in the body 1. By reason of the screw threaded connection between the draw bolt and the sleeve, the effective length of the draw bolt mechanism may be varied merely by turning the bolt 4 relatively to the sleeve 5. The sleeve 5 extends from the body 1 through an opening 7 which also forms a bearing for the sleeve 5.

A crosshead 8 is formed on the inner end of the sleeve 5 and is positioned within the body 1. A tapered latch member 9 is suitably connected to the outer end of the draw bolt. The latch member 9 is adapted to extend from the free edge *b* of the door to which the latch unit is attached and to engage the usual catch plate, well known in the art.

The latch member 9 is slidably mounted in a guide plug 10 which forms a bearing for the outer end of the draw bolt. The plug 10 is fitted into the free edge *b* of door *a* as more fully hereinafter set forth.

The pin 6 slidably engages sleeve 5 at one end, the pin 6 having a reduced end 11 that extends through the body 1 and said reduced end is riveted over to securely fix the pin to the body 1. Resilient means in the form of a spring 12 encircling the pin 6 operates between the cross head 8 and the body 1 to normally urge the draw bolt 4 outwardly. Adjustment of the effective length of the bolt mechanism by turning the bolt 6 relatively to the sleeve 5 has no effect on the spring 12. Furthermore, the spring is within the tubular body 1 and when the latch unit is applied to a door the necessity of separately applying the spring is done away with.

Oscillatable means are provided to engage the crosshead and retract the draw bolt 4 and such means comprise retracting members 13 each having a bearing 13′ journaled in the extension of plate 2, 3 and having on its inner end within the body 1, a disc 14 and on its outer end a reduced threaded tip 15 which extends beyond the outer end of the members 13 and is adapted to have a knob 16 of any convenient shape screwed thereon. An arcuate lug 17 is provided on the inner face of the disc 14 and the spring 12 normally holds the crosshead 6 against the ends of said lug 17. The parts are so assembled and related, as shown in Fig. 4, that, when in a state of rest, the plate 8 engages the ends of the lug 17 and holds the disc 14, and associated parts, in symmetrical and balanced position, with the latch 9 extended to full latching position.

Figure 1:
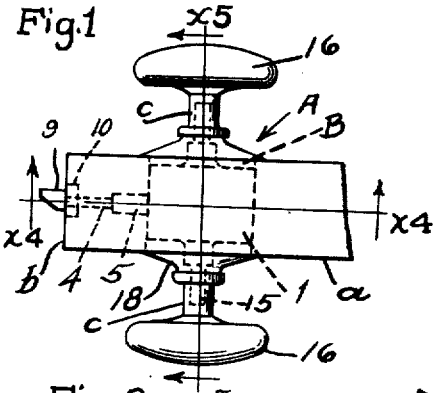
Figure 2:
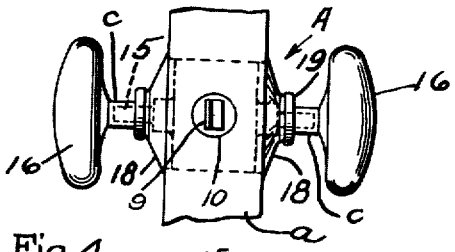
Fig. 2 is an edge view of the same looking from the left of Fig. 1.
Figure 3:
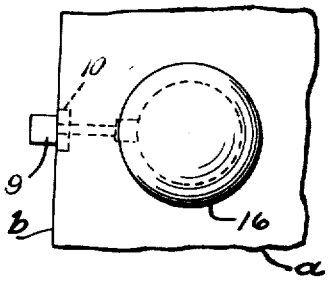
Fig. 3 is a side elevation of my latch unit in a door.
Figure 4:
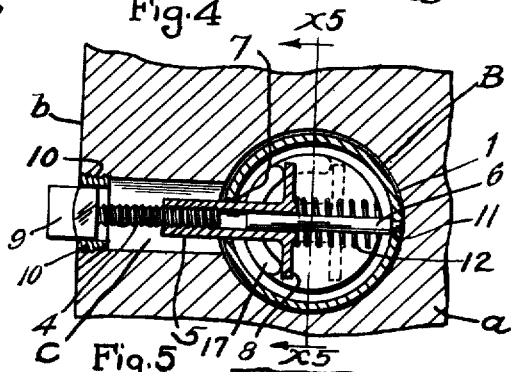
Fig. 4 is a sectional view on line $x^4$, Fig. 1.
Figure 5:
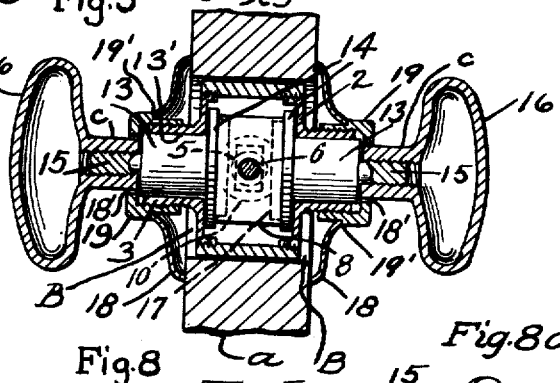
Fig. 5 is a sectional view on line $x^5$, Figs. 1 and 4.
Figure 6:
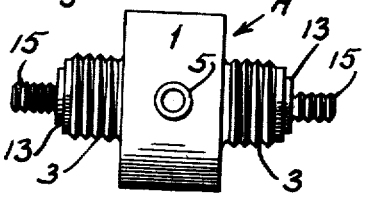
Fig. 6 is a detail edge view of the latch unit body assembly, detached from the door and co-related parts.
Figure 7:
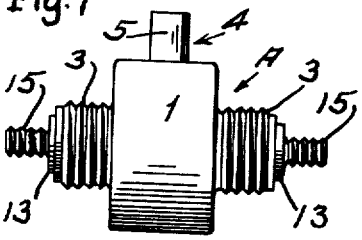
Fig. 7 is a plan view of the assembly shown in Fig. 6.

Rotation of either knob 16 oscillates the associated member 13 and lug 17 so that either end of said lug, according to the direction of rotation of said knob, will force the crosshead 8 inwardly against the tension of spring 12, as shown in dotted lines in Fig. 4, and thereby slide the draw bolt 4 inwardly and retract the latch member 9.

The crosshead 8 may be moved by rotation of one knob irrespective of whether the other knob is held, and may consequently be retracted by rotation of either knob in either direction, at all times. Rotation of either knob, to operate the latch, will not have any turning effect on the other knob, which will remain stationary, and the resistance to rotation will thus be lessened. Upon release of either turned knob, however, and return of the parts to normal position, under the action of spring 6, the disc will engage the lugs 17 on both knobs, ensuring correction of any accidental displacement of the idle knob, and positioning both for further operation.

A cover plate 18 is securely held in position over the tubular body 1 and bore B in which the body is mounted, by a cap 19 that is screwed onto each of the tubular extensions 3. The cap 19 is provided with a shoulder 19′ that engages the plate 18 and the tighter cap 19 is screwed onto the extension 3 the tighter plate 18 will be drawn against the door *a*.

Each cap 19 is formed with a central opening 18′ through which the shank *c* of the knob 16 enters when such knob is screwed home on the threaded tip 15.

To mount the latch unit A in the door *a*, a transverse bore B of suitable diameter to receive the lock body 1 is made through the door by any suitable bit and brace. A bore C is drilled into the bore B from the free edge *b* of the door and is of slightly smaller diameter than the guide plug 9 but still large enough to permit the tapered latch member 7 to be freely rotated therein during assembly.

In assembling the latch unit in a door the latch member 9 is detached from the sleeve 5, which is retracted into the lock body 1, thereby permitting such lock body to be inserted into the bore B. The sleeve member 5 is of such length and so cooperates with the tubular body 1 that the member 5 may be retracted or pushed into the body until it assumes a position in which it is substantially entirely within the confines of the body, thereby greatly facilitating the insertion of the body into the bore B. After the body has been inserted into the bore B, the sleeve member 5 is released and is projected by the action of the spring 12 into the bore C, whereupon the latch member 9 is threaded into sleeve 5 a sufficient distance to allow a predetermined length of said latch member to protrude from the free edge *b* of the door *a*. The guide plug 10 is then driven into the bore C until the outer face of the plug 10 is flush with the free edge of door *a*. The serrated edges of plug 10 tend to prevent accidental withdrawal of said plug.

The plug 10 prevents rotation of the latch member 9 and also closes the outer end of bore C, thereby providing a neat finished appearance.

While I have shown and described a present preferred embodiment of the invention, it is to be distinctly understood that the same is not limited thereto but may be otherwise variously embodied within the scope of the following claims.

I claim:

1. A latch unit comprising a body, a draw bolt having a crosshead member reciprocably mounted in said body; a coil spring urging said crosshead member in a direction outwardly from said body; a retracting member mounted in said body; means on said retracting member adapted to engage said crosshead to retract said crosshead member against the tension of said spring; and guide means on the latch body, forwardly and rearwardly of the crosshead, with which the crosshead has slidable engagement, a portion of such guide means being disposed in longitudinal guiding relationship with respect to the spring whereby to maintain the same in cooperative relationship with the crosshead member.

2. A latch unit comprising a body, a draw bolt comprising a crosshead member reciprocably mounted in said body, a latch member screwed into said crosshead member and adapted for longitudinal adjustment thereby; yielding means engaging said crosshead member for urging the same outwardly from said body; retracting members rotatably mounted in said body and comprising a disk, a lug on said disk adapted to engage said crosshead and retract said draw bolt in either direction of rotation; and a knob mounted on said retracting member.

3. A latch unit comprising a tubular body; tubular extensions on said body; a retracting member journalled in said tubular extensions; a knob on said retracting member; a guide pin extending into said body; a draw bolt having a crosshead member, said draw bolt being reciprocably mounted on said pin; and a spring between said body and said head to normally urge the draw bolt outwardly from said body.

4. A latch unit comprising a body having an extension forming a bearing member, a draw bolt extending from said body, a retracting member in said body adjacent said draw bolt and journaled in said bearing member, means on said retracting member adapted to engage and retract said draw bolt, resilient means in the body, centered substantially axially of the draw bolt, urging said draw bolt outwardly, and common guide means for the resilient means and draw bolt.

5. A latch unit comprising a body having an extension forming a bearing member, a draw bolt extending from said body, a retracting member in said body adjacent said draw bolt and journaled in said bearing member, means on said retracting member adapted to engage and retract said draw bolt, a spring in the body behind the draw bolt and disposed coaxially therewith for urging the draw bolt outwardly, and a common guide pin for the spring and draw bolt.

6. A latch unit comprising a body, a draw bolt comprising a crosshead member reciprocably mounted in said body; a sleeve extending from said crosshead; a latch member secured to said sleeve; a pin fixed to said body and extending into said sleeve; a spring surrounding said pin and engaging said head to urge the crosshead member outwardly; a retracting member comprising a disk; an arcuate lug on said disk against which said crosshead normally rests; and means to rotate said disk to retract said crosshead member and draw bolt.

7. A latch unit comprising a body, a draw bolt comprising a crosshead member reciprocably mounted in said body; a sleeve extending from said crosshead; a latch member secured to said sleeve; a pin fixed to said body and extending into said sleeve; a spring surrounding said pin and engaging said head to urge the crosshead member outwardly; a tubular extension on said body; a retracting member journalled in said extension; a knob secured to said retracting member; a disk on said retracting member; a lug on said disk against which said crosshead normally rests, said lug being adapted to retract said head when said knob is rotated; and other retracting means comprising a disk, a lug on said disk adapted to engage said head, said other retracting means being operable irrespective of said first-named retracting means.

8. A latch unit comprising a body, a latch carrier extending through one wall of the body, a guide member on the rear wall of said body for slidably supporting the inner end of the carrier, a cross head on the carrier disposed within the latch body, and means engaging the cross head for yieldingly urging the same in an outward direction.

9. A latch unit comprising a body, a latch carrier extending through one wall of the body, a guide member on the rear wall of said body for slidably supporting the inner end of the carrier, a cross head on the carrier disposed within the latch body, means engaging the cross head for yieldably urging the same in an outward direction, and a roll back member engaging said head to each side of the longitudinal center line of said carrier member.

10. A latch unit comprising a body, a cross head member mounted for reciprocable movement in said body, a latch member having a shank portion connected to and adjustable with respect to said cross head member on its longitudinal axis, retracting means disposed forwardly of said cross head for withdrawing the latch, and yieldable means disposed rearwardly of said cross head for urging the same forwardly.

11. A latch unit comprising a housing having an opening through one of its sides, a bolt carrier, a bolt having screw threaded connection with the outer end of said carrier, and a spring engaging a rear surface of the carrier to urge the same outwardly, the wall of said opening serving to guide the carrier and bolt during reciprocable movements thereof.

12. A bolt operating mechanism comprising in combination with a housing having a lateral orifice; a bolt carrier comprising a member operable in the housing, and provided with a lateral extension operable through the orifice, and adapted for connection with a latch bolt; means to move the carrier to operate the extension through the orifice, and resilient means in the housing behind the carrier urging the same outwardly.

13. A bolt operating mechanism comprising in combination with a housing having a lateral orifice; a bolt carrier comprising a member operable in the housing, and provided with a lateral extension operable through the orifice; means to move the carrier to operate the extension through the orifice, a bolt shank adjustably threaded in the extension, and resilient means in the housing behind the carrier urging the same outwardly.

14. A bolt operating mechanism comprising a housing having a lateral orifice; a bolt carrier comprising a member operable in the housing and an extension operable through the orifice; a spring within the housing and bearing against the carrier to hold the carrier toward the side of the housing having the orifice, and means to retract the carrier.

15. The combination with a housing having a lateral orifice, of a bolt carrier having a bore and mounted in the housing and provided with an extension in said orifice; a coil spring to hold the carrier toward that side of the housing provided with the orifice; said extension having a bore; a guide pin fixed in the housing and extending through the coil spring and into the bore; and means to retract the carrier and extension against the force of the spring.

16. The combination with a housing having a lateral orifice, and having a journal bearing in one end: of a carrier mounted in the housing and provided with a bore, and with an extension, operable in said orifice; a spring to hold the carrier toward the side of the housing provided with the orifice; a pin fixed in the housing and extending into the bore; a cam to operate the carrier, and a spindle carrying the cam and journaled in one of the bearings and adapted to operate the carrier to retract the carrier against the pressure of the spring.

17. A bolt operating mechanism comprising a housing having a journal bearing at one end and an orifice at one side, a bolt carrier provided with a flat face and having an extension operable through the orifice, means within the housing and bearing against the carrier to yieldingly hold the carrier toward the orifice; a plate having a spindle journalled in the bearing and a cam to retract the carrier.

18. Bolt operating mechanism comprising a housing having a chamber with a lateral orifice, a flat inside end wall and a journal bearing opening into the chamber through said end wall; a bolt carrier mounted in the chamber and having an extension in the lateral orifice; means within the housing and bearing against the carrier to hold the carrier toward the orifice; a disk fitted against the flat end wall and provided with a spindle in said bearing and with a cam to operate the carrier.

19. A latch unit comprising a body portion, a latch-carrying member supported thereby, a latch member adapted to be operated through the front of the body portion, a connecting device rigidly connected to one of said members and adjustably connected to the other member, means engaging the carrying member and bearing against the back of the body portion for yieldably urging said members outwardly, and means disposed forwardly of said last mentioned means for retracting the latch carrying member.

20. Latch structure, comprising bolt mechanism having a body portion, an operative portion connected therewith and longitudinally adjustable with respect thereto, a longitudinal guide extending within the body portion directly engaging the bolt mechanism in guiding relationship, and resilient means cooperating with the body portion of the bolt mechanism for urging the bolt mechanism longitudinally, the effect of such resilient means being unaffected by longitudinal adjustment of the bolt mechanism.

21. Latch structure, comprising a casing, bolt mechanism cooperating therewith, means connected with the bolt mechanism and effective in retraction thereof, a coil spring cooperating with such first mentioned means for urging the same in the direction of motion of the bolt mechanism to operative position, and a common guide for the coil spring extending within the same, such guide being separate from the bolt mechanism and directly engaging the bolt mechanism in guiding relationship.

22. Latch structure, comprising a casing, bolt mechanism cooperating therewith and adjustable as to length, resilient means within the casing and biased between the rearmost surfaces of the bolt mechanism and the opposed casing wall for urging the bolt mechanism outwardly thereof, the effect of such resilient means being unaffected by longitudinal adjustment of the bolt mechanism, and a guide pin connected with the casing and directly engaging the bolt mechanism in guiding relationship.

23. Latch structure, comprising a casing, bolt mechanism cooperating therewith and adjustable as to length, a retracting device fastened to and movable with the bolt mechanism, and resilient means within the casing bearing against and urging such retracting device in the direction of motion of the bolt mechanism to operative position.

24. Latch structure, comprising a casing, bolt mechanism cooperating therewith and adjustable as to length, a retracting device fastened to and movable with the bolt mechanism and effective in retraction thereof, and resilient means within the casing and bearing between a portion of such retracting device and the opposed casing wall whereby to urge the retracting device in the direction of motion of the bolt mechanism to operative position.

25. Latch structure, comprising a casing, bolt mechanism reciprocable with respect thereto, guide means connected with the casing and disposed interiorly thereof and extending generally in the direction of reciprocation of the bolt mechanism in direct contact and close fitting engagement therewith to guide the same in operative movements, and resilient means within the casing in cooperative relation to said guide means for urging the bolt mechanism outwardly.

26. Latch structure, comprising a casing, bolt mechanism reciprocable with respect thereto, and guide means within the casing, connected therewith and immovable with respect thereto, extending generally in the direction of reciprocation of the bolt mechanism and passing within a portion of the bolt mechanism whereby to guide the same both vertically and laterally in operative movements, the guide means being adapted to at all times have a substantial portion thereof in positive guiding relationship with respect to the bolt mechanism.

27. Latch structure, comprising a casing, bolt mechanism reciprocable with respect thereto, and a pin connected with the casing immovable with respect thereto and disposed interiorly thereof and passing within a socket formed in a portion of the bolt mechanism and shaped to directly contact and closely embrace the pin on at least three sides whereby to positively guide the bolt mechanism in operative movements, the pin being adapted to at all times have a substantial portion thereof within the socket.

28. Latch structure, comprising a casing, bolt mechanism reciprocable with respect thereto, a guide extension for the bolt mechanism within the casing, such guide extension being the support for holding up the bolt mechanism within the casing, and a coil spring about the guide extension for urging the bolt mechanism outwardly.

29. Latch structure, comprising a casing, bolt mechanism reciprocable with respect thereto, a crosshead connected with the bolt mechanism and effective in retraction thereof, such crosshead having a longitudinal socket, a guide extension within the casing and adapted to at all times have a substantial portion within the socket whereby to guide such crosshead both vertically and laterally in reciprocable movements and a retracting cam engaging the crosshead for retracting the bolt mechanism.

30. Latch structure, comprising a casing, bolt mechanism reciprocable with respect thereto, means connected with the bolt mechanism and effective in retraction thereof, such means having a longitudinal socket, a guide extension within the casing and operable at all times within the socket for guiding such means in reciprocative movements and effective for holding up such means within the casing, and a coil spring about the guide extension for urging such means generally in the direction of the guide extension.

31. Latch structure, comprising a casing, reciprocable bolt retracting mechanism therein having a longitudinal socket, a guide pin within the casing extending forwardly from the rear wall thereof to enter and directly engage the socket in the bolt retracting mechanism and holding up the bolt retracting mechanism within the casing, and a coil spring disposed about the guide pin between the bolt retracting mechanism and the casing and urging the bolt retracting mechanism forwardly.

32. Latch structure, comprising a casing, bolt mechanism cooperating therewith comprising a bolt member and crosshead means adjustably screw threaded thereto, retracting means operable to retract the crosshead means, guide means within the casing for guiding the bolt mechanism, and spring means within the casing, bearing against the inner surface of the crosshead means and disposed inwardly of the casing with respect to the retracting means for urging the bolt mechanism outwardly of the casing.

33. A latch unit comprising a body-portion having bearing members at opposite sides, a reciprocable draw-bolt carrier mounted in said body-portion at substantally right angles to said bearing members, said body-portion having an opening against which said carrier is slidably guided, independently operable draw bolt actuating devices traversing said bearing members, operating connections between said devices and said draw-bolt, and exteriorly disposed means for moving said draw-bolt actuating devices.

34. A latch unit comprising a body-portion having bearing member at opposite sides, a reciprocable spring-projected draw-bolt carrier mounted in said body-portion at substantially right angles to said bearing members, independently operable draw-bolt retracting devices traversing said bearing members, operating connections between said devices and said draw-bolt, and exteriorly disposed means for moving said draw-bolt retracting devices, said body-portion having an opening against which said carrier is slidably guided, said body-portion also having other guiding means for said carrier.

In testimony whereof I have hereunto set my hand.

WILLIAM E. WREAD.

CERTIFICATE OF CORRECTION.

Reissue Patent No. 18,399. Granted March 29, 1932, to

WILLIAM E. WREAD.

It is hereby certified that error appears in the printed specification of the above numbered patent requiring correction as follows: Page 4, line 122, claim 21, beginning with the word "extending" strike out all to and including the word "relationship" in line 125, and insert instead and bolt mechanism extending within the same and directly engaging the bolt mechanism in guiding relationship, such guide being separate from the bolt mechanism; same page, line 130, claim 2, for "surfaces" read surface; page 6, line 2, claim 34, for "member" read members; and that the said Letters Patent should be read with these corrections therein that the same may conform to the record of the case in the Patent Office.

Signed and sealed this 17th day of May, A. D. 1932.

M. J. Moore,
Acting Commissioner of Patents.

(Seal)